Patented Apr. 3, 1928.

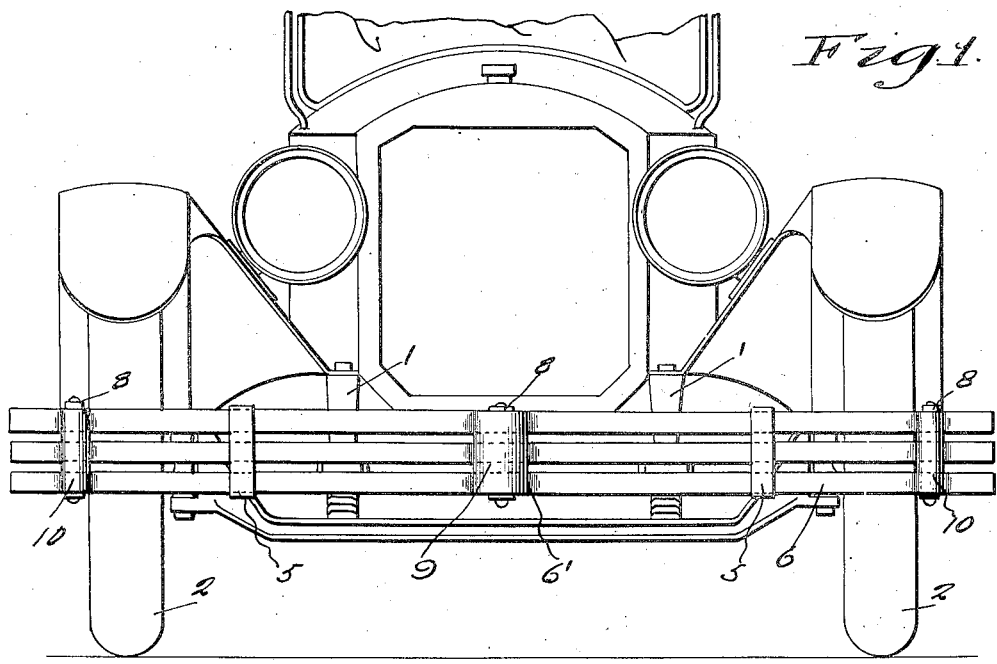
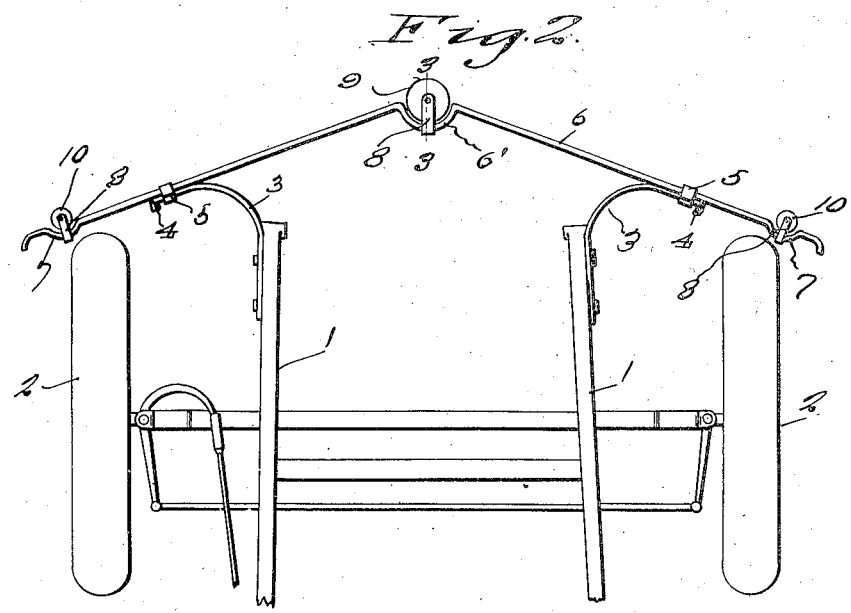
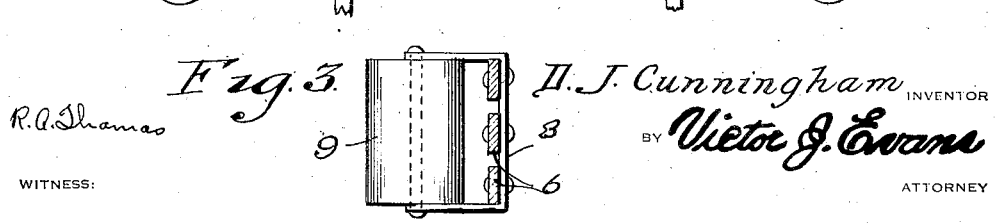

1,665,085

UNITED STATES PATENT OFFICE.

DENNIS J. CUNNINGHAM, OF WASHINGTON, DISTRICT OF COLUMBIA.

ROLLER GUARD FOR AUTOMOBILES.

Application filed August 27, 1927. Serial No. 215,873.

My present invention has reference to a bumper for automobiles or like vehicles and my object is the provision of an improved form of resilient bumper constructed to cause an object struck to be deflected toward the sides of the vehicle, and thereby prevent serious injury to the object or to the vehicle.

A further object is the provision of a bumper that in itself comprises a resilient member which is substantially V-shaped in plan and which is yieldably supported upon the front of a vehicle, the said bumper constituting similarly constructed bars which, at the apex and adjacent to the ends thereof are depressed or rounded inwardly for the reception of rollers that are mounted in substantially U-shaped brackets which also connect the bars of the bumper, and further wherein the spring curved or arched supports, attached to the front of the vehicle frame are slidably mounted in brackets that are secured to the bumpers, and still further wherein the rollers project or extend only a slight distance beyond the bumpers proper, the said distance, however, being sufficient for the rollers to engage with an obstacle contacted by the bumper and to guide the said obstacle over the inclined sides of the bumper and out of the path of contact with the wheels of the vehicle.

To the attainment of the above broadly stated objects the improvement consists in certain other novel features of construction, combination and operative association of parts, one satisfactory embodiment of which is disclosed by the accompanying drawings.

In the drawings:

Figure 1 is a front elevation of an automobile equipped with the improvement.

Figure 2 is a top plan view of the front portion of the running gear of the automobile with the improvement applied.

Figure 3 is an enlarged sectional view on the line 3—3 of Figure 2.

In the showing of the drawings my improvement is illustrated attached to the front portion of an ordinary automobile, but obviously the bumper may be attached to other types of vehicles.

Referring now to the drawings in detail, the numeral 1 designates the side bars of the frame for the body of the automobile, and 2 the front wheels of the vehicle.

Secured to the outer sides, adjacent to the outer ends of the said bars there are the straight portions of outwardly rounded spring members 3. These spring members preferably have their outer ends offset, as at 4. The springs pass through clips 5 that have their outer faces fixedly secured to the bars 6 that constitute the bumper. Any desired number of bars may be employed, the same being suitably spaced. The bars are each substantially V-shaped in plan and the center or apex of each of the bars is formed with an inwardly rounded depression 6′, while the said bars adjacent to their ends are formed with similar depressions 7. By reference to the drawings it will be seen that the bars constituting the bumpers are extended a suitable distance beyond the sides of the wheels 2 and are, of course, arranged forward of the said wheels. Connecting the bars that constitute the bumper and disposed at the center of the inwardly depressed portions 6′ and 7 thereof there are U shaped brackets 8. The parallel and outwardly extending arms of these brackets 8 have openings that provide bearings for the shafts of rollers 9 and 10, respectively. The roller 9 is arranged in the depression at the center or apex of the bumper and is of a larger cross sectional diameter than the rollers 10 that are received in the depressions 7 of the bumper.

The bumper, being constructed of metal embodies a natural resiliency and the spring members 3 which provide the supports for the bumper afford a resilient connection of the bumper with the vehicle. An obstacle contacted by the central roller 9 will cause the same to turn and direct such obstacle against either of the inclined sides of the bumper, while the rollers 10 engaging such obstacle will direct the same toward the sides of the vehicle so that serious injury to the person contacting the bumper will be thus effectively prevented.

The improvement is of a simple construction and can be readily applied to any ordinary construction of vehicle and while I have illustrated a satisfactory embodiment of the improvement, obviously I do not wish to be limited to the precise details herein set forth and consequently hold myself entitled to make such changes therefrom as fairly fall within the scope of what I claim.

Having described the invention, I claim:

1. A bumper for vehicles comprising flat bars which are substantially V-shaped in plan and which have inwardly rounded depressed portions at the center and adjacent to the ends thereof, substantially U-shaped brackets fixedly secured to the bars of the bumper, rollers having shafts journaled in the parallel arms of the brackets and arranged in the respective depressions and partly projecting therethrough, and a yieldable support for the bumper.

2. A bumper for vehicles comprising flat bars which are substantially V-shaped in plan and which have inwardly rounded depressed portions at the center and adjacent to the ends thereof, substantially U-shaped brackets fixedly secured to the bars of the bumper, rollers having shafts journaled in the parallel arms of the brackets and arranged in the respective depressions and partly projecting therethrough, fixedly supported arched springs having their free ends offset, and clips surrounding the sides of the bumper and the free ends of the arched springs for securing the bumper to the springs.

In testimony whereof I affix my signature.

DENNIS J. CUNNINGHAM.